(12) United States Patent
Alholm

(10) Patent No.: US 8,733,078 B2
(45) Date of Patent: May 27, 2014

(54) IGNITER WITH INTEGRAL PRESSURE SENSING LINE

(75) Inventor: Hannes A. Alholm, Tolland, CT (US)

(73) Assignee: United Technologies Corporation, Hartford, CT (US)

( * ) Notice: Subject to any disclaimer, the term of this patent is extended or adjusted under 35 U.S.C. 154(b) by 844 days.

(21) Appl. No.: 12/943,498

(22) Filed: Nov. 10, 2010

(65) Prior Publication Data
US 2012/0110975 A1  May 10, 2012

(51) Int. Cl.
*F02C 7/264*  (2006.01)
*F02C 7/266*  (2006.01)

(52) U.S. Cl.
USPC ............... 60/39.821; 60/39.826; 60/39.827

(58) Field of Classification Search
USPC .................... 60/39.821, 39.826, 39.827; 431/259–266
See application file for complete search history.

(56) References Cited

U.S. PATENT DOCUMENTS

| | | | |
|---|---|---|---|
| 3,330,985 A * | 7/1967 | Johnston ................... 313/120 |
| 3,736,748 A | 6/1973 | Walker et al. |
| 4,170,111 A | 10/1979 | Lewis et al. |
| 4,510,794 A | 4/1985 | Couch |
| 4,765,136 A | 8/1988 | Clements et al. |
| 5,353,721 A * | 10/1994 | Mansour et al. ............... 110/345 |
| 5,672,812 A | 9/1997 | Meyer |
| 5,685,142 A | 11/1997 | Brewer et al. |
| 6,119,667 A | 9/2000 | Boyer et al. |
| 6,138,654 A | 10/2000 | Pretorius et al. |
| 6,199,365 B1 | 3/2001 | Pretorius et al. |
| 6,799,451 B2 | 10/2004 | Kiess et al. |
| 7,437,876 B2 * | 10/2008 | Koshoffer ...................... 60/761 |
| 7,637,096 B2 * | 12/2009 | Razzell et al. .................. 60/247 |
| 2009/0133379 A1 | 5/2009 | Mendoza et al. |
| 2009/0173321 A1 | 7/2009 | Horn et al. |

FOREIGN PATENT DOCUMENTS

| | | |
|---|---|---|
| EP | 1553391 A1 | 7/2005 |
| JP | 4149986 A | 5/1992 |
| WO | 2004083623 A1 | 9/2004 |

OTHER PUBLICATIONS

European Patent Office, Extended European Search Report, May 10, 2012, 5 pages.

* cited by examiner

*Primary Examiner* — Ehud Gartenberg
*Assistant Examiner* — Arun Goyal
(74) *Attorney, Agent, or Firm* — Kinney & Lange, P.A.

(57) ABSTRACT

An igniter device for a combustor system includes an igniter housing and a pressure sense passage. The igniter housing surrounds an electrode and an insulating body. The igniter has a tip to be positioned within a chamber for combustion. The pressure sense passage is attached to an exterior surface of the igniter housing. The pressure sense passage is configured to direct fluid to a pressure sensor.

18 Claims, 5 Drawing Sheets

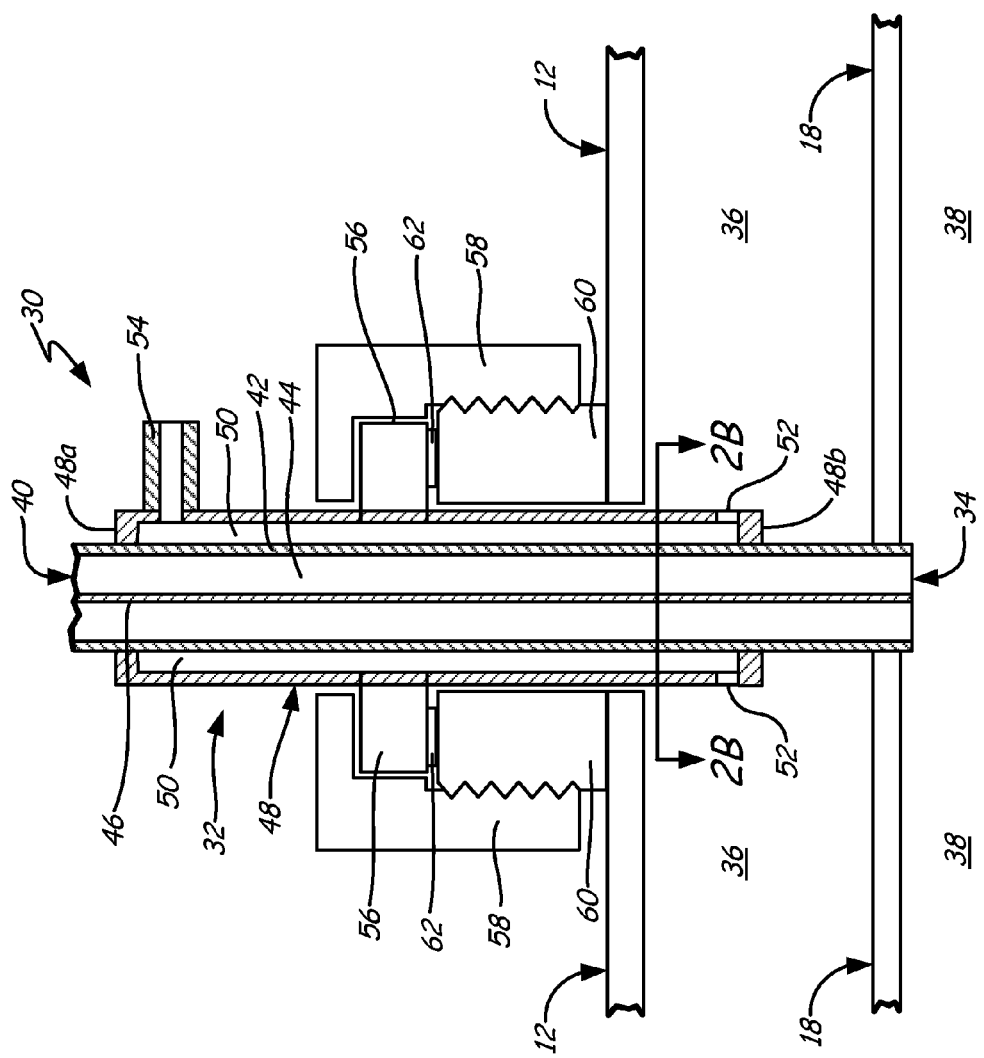

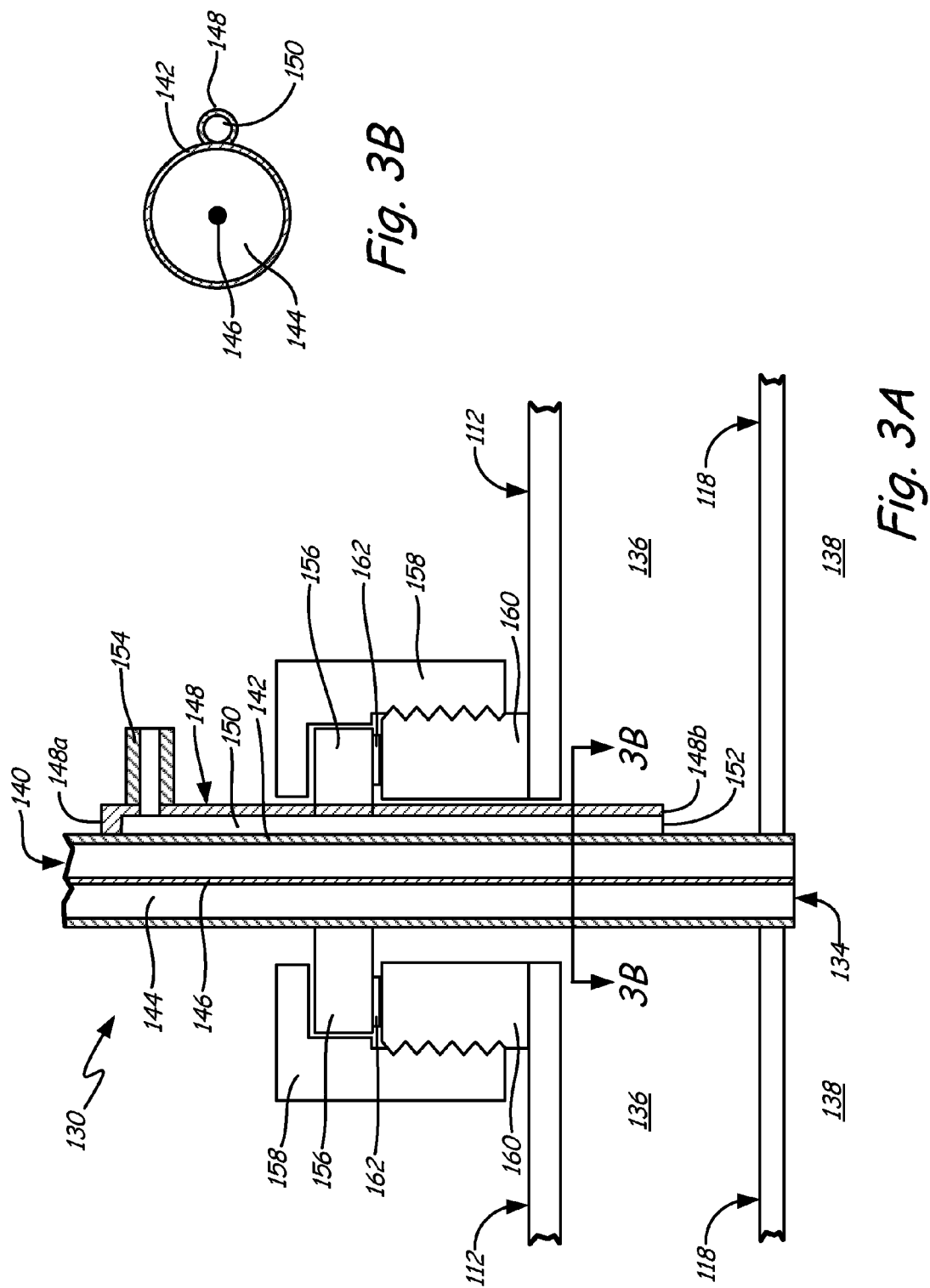

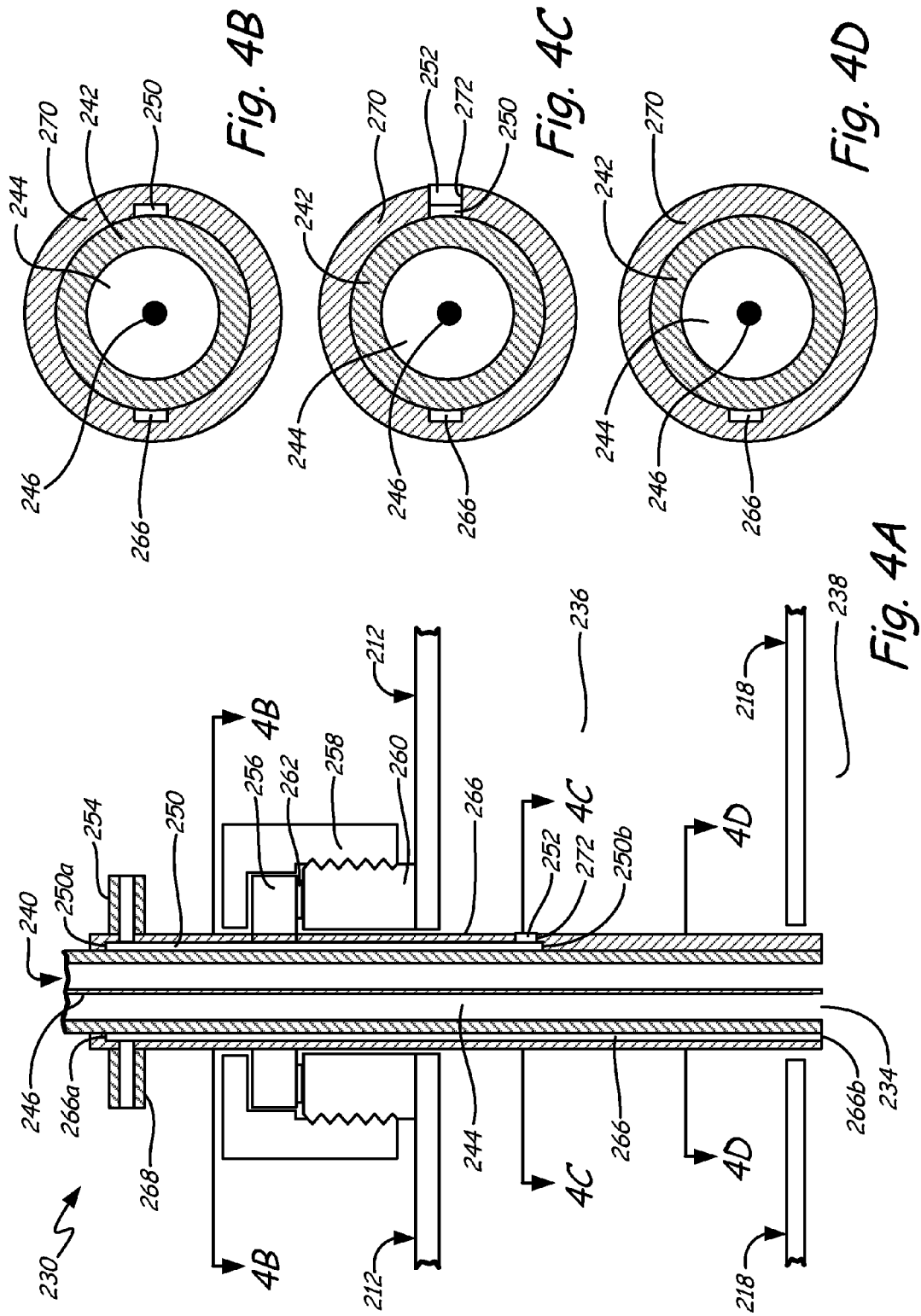

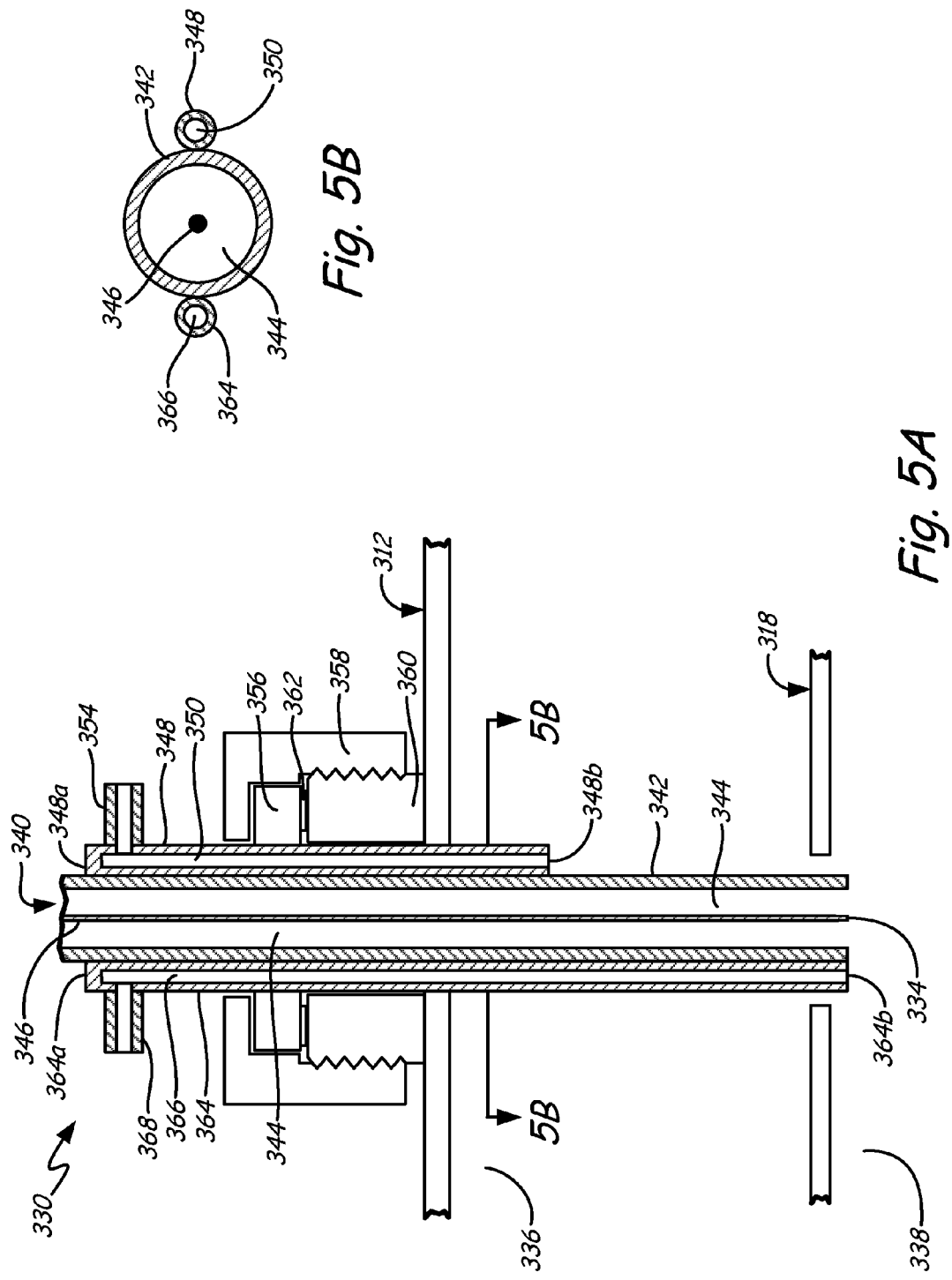

US 8,733,078 B2

IGNITER WITH INTEGRAL PRESSURE SENSING LINE

STATEMENT OF GOVERNMENT INTEREST

The U.S. Government has a paid-up license in this invention and the right in limited circumstances to require the patent owner to license others on reasonable terms as provided for by the terms of N00019-02-C-3003 awarded by the United States Navy.

BACKGROUND

Igniters are used to provide effective sparks in a combustion chamber of a gas turbine engine. An igniter typically comprises an electrode extending through the center of a cylindrical grounded igniter tube. A ceramic insulating core is located between the electrode and the igniter tube to insulate the electrode and prevent grounding the electrode. The igniter mounts to a diffuser casing surrounding the combustion chamber, and the operative tip of the igniter typically projects slightly into the combustion chamber. When an electrical signal is sent through the electrode, a spark is produced at the operative end which ignites the fuel in the combustion chamber.

A pressure sensor is typically located downstream of the igniter to sense the fluid pressure feeding the combustion chamber. The pneumatic pressure sensor includes a sense tube that extends through the diffuser casing. The tip of the sense tube is located in an annular chamber formed between the diffuser casing and the combustion chamber so that gases feeding the combustion chamber are directed through the sense tube to the pneumatic sensor. Many components are required to mount the pressure sensor to the combustion system. For example, several brackets, fittings and tube assemblies are used to attach the pressure sensor to the combustion system. These components add additional assembly, weight and cost to the gas turbine engine.

An augmenter or afterburner system includes an igniter and pressure sensor similar to a combustor system. The igniter of an afterburner is positioned slightly within the casing wall of a chamber for combustion, and the pressure sensor is positioned in a chamber formed between a diffuser casing and the chamber for combustion. The afterburner system further includes a second pressure sensor to measure the pressure within the afterburner's chamber for combustion. This second pneumatic sensor includes a second sense tube that extends through the diffuser casing and the casing of the chamber for combustion. The tip of the second sense tube is located within the afterburner's chamber for combustion. The second sense tube directs gases from the afterburner's chamber for combustion to the second pressure sensor to determine the burner pressure. The pressure within the afterburner's chamber for combustion is used by the engine control system for several different operations, including controlling the fuel-air mix ratio. Similar to the first pneumatic sensor, many components are required to mount the second pneumatic sensor to the augmenter system. These components add assembly time, weight, and cost to the afterburner system.

SUMMARY

An igniter device for a combustor system includes an igniter housing and a pressure sense passage. The igniter housing surrounds an electrode and an insulating body. The igniter has a tip to be positioned within a chamber for combustion. The pressure sense passage is attached to an exterior surface of the igniter housing. The pressure sense passage is configured to direct fluid to a pressure sensor.

BRIEF DESCRIPTION OF THE DRAWINGS

FIG. 2A is an enlarged cross-sectional view of an igniter.
FIG. 2B is a cross-sectional view of the igniter of FIG. 2A taken along line 2B-2B.
FIG. 3A is an enlarged cross-sectional view of another igniter.
FIG. 3B is a cross-sectional view of the igniter of FIG. 3A taken along line 3B-3B.
FIG. 4A is an enlarged cross-sectional view of a further igniter.
FIG. 4B, FIG. 4C and FIG. 4D are cross-sectional views of the igniter of FIG. 4A taken along lines 4B-4B, 4C-4C and 4D-4D, respectively.
FIG. 5A is an enlarged cross-sectional view of a further igniter.
FIG. 5B is a cross-sectional view of the igniter of FIG. 5A taken along line 5B-5B.

DETAILED DESCRIPTION

Figure 1:
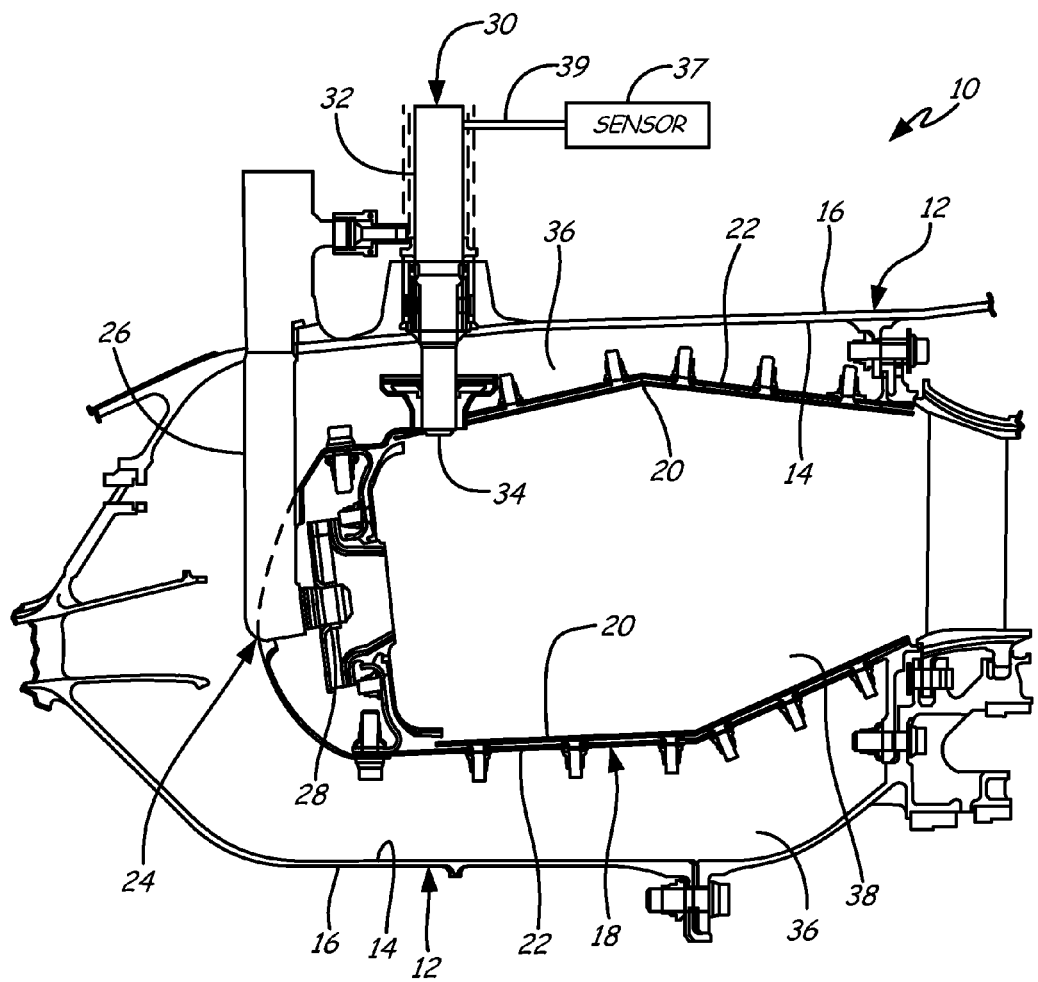
FIG. 1 is a cross-sectional view of a combustor system.

FIG. 1 is a cross-sectional view of combustor system 10, which includes diffuser 12 (having inner surface 14 and outer surface 16), combustion chamber 18 (having inner surface 20 and outer surface 22), fuel nozzle assembly 24 (having nozzle support structure 26 and fuel nozzle 28), and igniter 30 (having igniter body 32 and operative tip 34). Diffuser 12 is annular and encloses combustion chamber 18. Inner surface 14 of diffuser 12 is outwardly spaced from outer surface 22 of combustion chamber 18 forming annular passage 36.

Combustion chamber 18 is spaced radially inwards from diffuser 12. Combustion chamber 18 is also annular. Inner surfaces 20 are spaced apart to define annular passage 38 there between.

Fuel nozzle assembly 24 supplies fuel to combustion chamber 18. Fuel nozzle assembly 24 includes nozzle support structure 26 and fuel nozzle 28. Fuel nozzle assembly 24 is mounted on outer surface 16 of diffuser 12 and extends through diffuser 12. Fuel nozzle 28 is supported by nozzle support structure 26 and extends into annular passage 38 of combustion chamber 18.

Igniter 30 includes igniter body 32 and operative tip 34. Igniter body 32 extends through the walls of diffuser 12 and combustion chamber 18 so that operative tip 34 is located within annular passage 38. As explained further below, igniter 30 produces a spark at operative tip 34. In use, fuel nozzle 28 sprays fuel into combustion chamber 18, and igniter 30 produces a spark at operative tip 34 to ignite the fuel within combustion chamber 18.

Pressure sensor 37 is typically used in combustor system 10 to measure the pressure of gases entering combustion chamber 18. A sense tube directs fluid or gases from the annular passage 36 to pressure sensor 37. The sense tube extends through diffuser 12 and has an end located in annular passage 36. Tubing 39 connects the sense tube to pressure sensor 37. As described further below, the sense tube is incorporated into and integral with igniter 30.

FIG. 2A is an enlarged cross-sectional view of igniter 30 and FIG. 2B is a cross-sectional view taken along line 2B-2B of FIG. 2A. Igniter 30 includes body 32, operative tip 34, first end 40, igniter tube or housing 42, insulator 44, electrode 46 and sense tube 48. One skilled in the art will recognize that igniter 30 is illustrated having a generic operative tip 34 and first end 40. The design of operative tip 34 and first end 40 can be varied. Additionally, one skilled in the art will recognize that igniter 30 attaches to an igniter electrical connector at first end 40.

Igniter tube 42 can be a hollow body having first end 40 and operative tip 34 opposite first end 40. As described above, operative tip 34 is positioned within annular passage 38. Electrode 46 can extend axially through the center of igniter tube 42 from first end 40 to operative tip 34. Electrode 46 is exposed at operative tip 34. Insulator 44 surrounds electrode 46 and separates electrode 46 from igniter tube 42. Igniter tube 42 surrounds electrode 46 and insulator 44. In use, an electrical signal is sent through electrode 46 to produce a spark at operative tip 34 and ignite fuel within annular passage 38.

Sense tube 48 attaches to the outer surface of igniter tube 42. Sense tube 48 and igniter tube 42 are coaxial and concentric. For example, sense tube 48 can be a hollow tube having a larger diameter than igniter tube 42 so that igniter tube 42 fits within sense tube 48. Chamber or pressure sense chamber 50 is formed between the inner surface of sense tube 48 and the outer surface of igniter tube 42. Sense tube 48 extends through the wall of diffuser 12 and terminates at a location in annular passage 36. Sense tube 48 includes first end 48a and second end 48b. Second end 48b is located within annular passage 36 and first end 48a is located outside annular passage 36.

Holes 52 are formed in sense tube 48 at second end 48b. Pressure fitting 54 extends from first end 48a and is in communication with chamber 50. Pressure fitting 54 is connected to a pressure sensor as known to one skilled in the art. Holes 52 enable gases from annular passage 36 to enter chamber 50 and flow to first end 48a of sense tube 48. At first end 48a, the gases are directed to a pressure sensor through tubing or piping attached to pressure fitting 54. Thus, the pressure of the gases feeding combustion chamber 18 is measured using sense tube 48. The measured pressure can be used by the engine controller to regulate fuel flow to combustion chamber 18.

Igniter 30 attaches to diffuser 12 by flange 56, nut 58, threaded fitting 60 and seal 62. Flange 56 radially extends from the outer surface of sense tube 48. For example, flange 56 can be a machined feature of sense tube 48. Alternatively, flange 56 can be welded or brazed to sense tube 48. Alternatively, flange 56 can be investment cast into sense tube 48.

Threaded fitting 60 is integral with or attaches to outer surface 16 of diffuser 12. Nut 58 fits over flange 56 and attaches to threaded fitting 60. Seal 62 can be positioned between flange 56 and threaded fitting 60 to seal the connection between these components. Flange 56, nut 58 and threaded fitting 60 provide the ability to rotate pressure fitting 54 into the proper orientation and alignment with external tubing connecting to the pressure sensor. Sense tube 48 and chamber 50 are integral with igniter tube 42 in igniter 30 so that a single component is mounted to diffuser 12. In igniter 30, sense tube 48 and igniter tube 42 are coaxial and chamber 50 is formed between sense tube 48 and igniter tube 42. Flange 56 and nut 58 connect the integral igniter to diffuser 12.

FIG. 3A is an enlarged cross-sectional view of example igniter 130 and FIG. 3B is a cross-section of igniter 130 taken along line 3B-3B of FIG. 3A. Similar to igniter 30, igniter 130 includes operative tip 134, first end 140, igniter tube 142, insulator 144, electrode 146 and sense tube 148. Similar to igniter 30, electrode 146 can extend through the center of igniter tube 142, and insulator 144 prevents contact between igniter tube 142 and electrode 146.

Sense tube 148 is attached to the outer surface of igniter tube 142. In one example, sense tube 148 is attached to the outer surface of igniter tube 142 by methods such as but not limited to welding and soldering. Sense tube 148 and igniter tube 142 are approximately parallel to one another and extend along separate axes as illustrated in FIG. 3B. Chamber or pressure sense chamber 150 is defined by the inner walls of sense tube 148.

Sense tube 148 includes first end 148a and second end 148b. First end 148a is adjacent or proximate first end 140 of igniter 130. Pressure fitting 154 is connected to sense tube 148 near first send 148a and is in fluid communication with chamber 150.

Second end 148b is opposite first end 148a. Second end 148b is located in annular passage 136. Hole 152 is formed in the end of sense tube 148 so that second end 148b is open. Gases from annular passage 136 enter sense tube 148 through hole 152 and flow to pressure fitting 154, where the gases are transferred to a pressure sensor by tubing. In this way, the pressure of the gases feeding combustion chamber 118 is measured using pressure sense tube 148.

Igniter 130 is mounted to diffuser 112 with flange 156, nut 158, threaded fitting 160 and seal 162. Flange 156, nut 158, threaded fitting 160 and seal 162 function in a manner similar to flange 56, nut 58, threaded fitting 60 and seal 62 of FIG. 2A. Flange 156, nut 158, threaded fitting 160 and seal 162 allow igniter 130 to be rotated into the proper orientation and alignment to connect pressure fitting 154 with external tubing. In igniter 130, sense tube 148 and chamber 150 are integrated with igniter tube 142 to form a single component. Sense tube 148 is attached to the exterior surface of igniter tube 142 and is parallel to igniter tube 142. Flange 156 and nut 158 attach igniter 130 to diffuser 112.

A second pressure sensor may also be used to measure the pressure within the combustion chamber (i.e., burner pressure). The second pressure sensor includes a second sense tube that extends through the diffuser and combustion chamber casings and has an end located in the combustion chamber. As described further below, the first sense tube and second sense tube are incorporated into and integral with igniter.

FIG. 4A is an enlarged cross-sectional view of igniter 230 having operative tip 234, first end 240 opposite operative tip 234, igniter tube 242, insulator 244, electrode 246, first chamber or pressure sense chamber 250, first pressure fitting 254, second chamber or second pressure sense chamber 266, second pressure fitting 268, tube 270 and tube 272. FIG. 4B is a cross-section taken at line 4B-4B of FIG. 4A. FIG. 4A and FIG. 4B will be discussed together.

Insulator 244 and electrode 246 are arranged within igniter tube 242 as described above. Tube 270 is coaxial with igniter tube 242. Tube 270 has a larger inner diameter than the outer diameter of igniter tube 242 so that igniter tube 242 slides within tube 270. Tube 270 and igniter tube 242 are sized so that the inner surface of tube 270 abuts the outer surface of igniter tube 242.

First chamber 250 and second chamber 266 are formed in the inner surface of tube 270, and are attached to an outer or exterior surface of igniter tube 242. As shown in FIGS. 4B-4D, first chamber 250 and second chamber 266 are formed between the outer surface of igniter tube 242 and a surface of tube 270. First chamber 250 and second chamber 266 are substantially parallel to igniter tube 242 and to each other. Although first chamber 250 and second chamber 266 are illustrated as located 180 degrees apart, first chamber 250 and second chamber 266 may be positioned at any angle relative to one another.

First chamber 250 has first end 250a and second end 250b. First end 250a is located proximate first end 240 of igniter tube 242. Second end 250b is located between the casings of combustion chamber 218 and diffuser 212. First chamber 250 does not extend to operative tip 234.

First pressure fitting 254 is connected near first end 250a and is in fluid communication with first chamber 250. Tube 272 is connected to first chamber 250 near second end 250b. Tube 272 is in fluid communication with first chamber 250 and extends between chamber 250 and hole 252 formed in tube 270. Hole 252 is positioned within annular passage 236. In use, fluid from annular passage 236 flows through hole 252 to tube 272. Tube 272 directs the fluid to first chamber 250, which connects to pressure fitting 254. Tubing attaches to pressure fitting 254 which directs the fluid to a pressure sense. In this way, pressure in annular passage 236 is measured using first chamber 250. Annular passage 236 contains gases fed to combustion chamber 218.

Second chamber 266 has first end 266a and second end 266b. First end 266a is proximate first end 240 of igniter tube 242. Second pressure fitting 268 is connected to second chamber 266 near first end 266a and is in fluid communication with second chamber 266.

Second end 266b of second chamber 266 is positioned within annular passage 238. Second end 266b of second chamber 266 is open. In use, gases from annular passage 238 flows through the open second end 266b, through second chamber 266 to second pressure fitting 268. Second pressure fitting 268 attaches to tubing which directs the gases to a pressure sense. In this way, the pressure of annular passage 238 is determined. This pressure is also known as the burner pressure.

First chamber 250 and second chamber 266 are separate chambers. Gases from annular passage 236 feed first chamber 250, and gases from annular passage 238 feed second chamber 266. In this way, gases from annular passage 236 are fed exclusively to first pressure fitting 254, and gases from second annular passage 238 are fed exclusively to second pressure fitting 268.

Igniter 230 is mounted to diffuser 212 by flange 256, nut 258, threaded fitting 260 and seal 262. Flange 256, nut 258, threaded fitting 260 and seal 262 function in a manner similar to flange 56, nut 58, threaded fitting 60 and seal 62 of FIG. 2A. In igniter 230, first chamber 250 and second chamber 266 are integrated with igniter tube 242 to form a single component for instillation on diffuser 212. Flange 256 can also be integrated with igniter tube 242.

FIG. 5A is an enlarged cross-sectional view of igniter 330 and FIG. 5B is a cross-sectional view of igniter 330 taken at line 5B-5B of FIG. 5A. Igniter 330 includes igniter tube 342 (having first end 340 and operative tip 334), insulator 344, electrode 346, first sense tube 348, first chamber or first pressure sense chamber 350, first pressure fitting 354, second sense tube 364, second chamber or second pressure sense chamber 366 and second pressure fitting 368.

Insulator 344 and electrode 346 are arranged in igniter tube 342 as described above. First sense tube 348 is attached to the outer surface of igniter tube 342. First sense tube is approximately parallel to igniter tube 342. First sense tube 348 extends from a location proximate first end 340 of igniter tube 342 to a location between the casings of diffuser 312 and combustion chamber 318. First chamber 350 is defined between the walls of first sense tube 348 as shown in FIG. 5B.

First sense tube 348 includes first end 348a and second end 348b opposite first end 348a. First end 348a is proximate first end 340 of igniter tube 342 and opposite operative tip 334. First pressure fitting 354 is connected to and extends away from first sense tube 348. First pressure fitting 354 is in fluid communication with first chamber 350.

Second end 348b is open and is positioned in annular passage 336. In use, fluid or gases from annular passage 336 flows through the open end of second end 348b, through first chamber 350 to first pressure fitting 354. First pressure fitting 354 is connected to a pressure sensor. In this way, first sense tube 348 is used to measure the pressure of annular passage 336.

Second sense tube 364 is also attached to the outer surface of igniter tube 342 and is approximately parallel to igniter tube 342. First sense tube 348 and second sense tube 364 can be attached to igniter tube 342 by methods such as but not limited to soldering and welding. Second chamber 366 is defined between the walls of second sense tube 364 as shown in FIG. 5B. Although first sense tube 348 and second sense tube 364 are illustrate 180 degrees apart, the positions of first sense tube 348 and second sense tube 364 relative to one another may be varied.

Second sense tube 364 extends from a position proximate first end 340 to a position within combustion chamber 318. Second sense tube 364 includes a first end 364a and second end 364b. Pressure fitting 368 is attached to second sense tube proximate first end 364a and is in fluid communication with second chamber 366. Second end 364b is open. In use, gases from annular passage 338 flow into second chamber 366 by entering the open second end 364b. The gases then flow to second pressure fitting 368 which directs the gases to a pressure sensor.

Igniter 330 connected to diffuser 312 by flange 356, nut 358, threaded fitting 360 and seal 362. Flange 356, nut 358, threaded fitting 360 and seal 362 function in a manner similar to flange 56, nut 58, threaded fitting 60 and seal 62 of FIG. 2A. In igniter 330, first sense tube 348 and second sense tube 364 (and thus, first chamber 350 and second chamber 366) are integrated with igniter tube 342 such that only one component is mounted to diffuser 312. Integrating first sense tube 348, second sense tube 364 and igniter tube 342 creates a single component that serves dual purposes by combining the igniter and pressure probe. This integration reduces the number of mounting components required, reducing costs and assembly time, and reduces the number of penetrations in diffuser 312.

Although igniter 30, igniter 130, igniter 230, and igniter 330 have been described above with respect to use in a combustion chamber, igniters 30, 130, 230 and 330 can also be used in an afterburner or thrust augmenter. An afterburner's operation is much like the operation of a combustion chamber. In an afterburner, fuel is added to exhaust gases after they have passed through the turbine section. At this point the exhaust still contains uncombined oxygen. The resultant temperature increase raises the velocity of the exiting gases and boosts engine thrust. An afterburner section includes a diffuser and an afterburner where combustion occurs. One skilled in the art will recognize that the diffuser described above can be a diffuser of a combustor system or of an afterburner system, and that the combustion chamber described above refers to either the chamber for combustion in a combustor system or in an afterburner system.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An igniter device for a combustion system, the device comprising:
    an igniter housing surrounds an electrode and an insulating body and having a tip to be positioned within a combustion chamber;
    a first pressure sense passage arranged along an exterior surface of the igniter housing, wherein the first pressure sense passage is configured to direct a fluid to a first pressure sensor from an annular passage arranged around the combustion chamber; and
    a second pressure sense passage arranged along the exterior surface of the igniter housing, wherein the second pressure sense passage is configured to direct the fluid from within the combustion chamber to a second pressure sensor.

2. The device of claim 1, wherein the first pressure sense passage is coaxial with the igniter housing.

3. The device of claim 1, wherein the first pressure sense passage is parallel to the igniter housing.

4. The device of claim 1, wherein the combustion chamber is an augmenter.

5. The device of claim 1, wherein the first pressure sense passage and the second pressure sense passage are coaxial with the igniter housing.

6. The device of claim 1, wherein the first pressure sense passage and the second pressure sense passage are parallel to the igniter housing.

7. The device of claim 1, and further comprising:
    a flange radially extending from the first pressure sense passage for attaching the igniter device to the combustion system.

8. The device of claim 7, and further comprising:
    a nut configured to fit over the flange and attach to a connection on the combustion system.

9. A combustion system for a gas turbine engine, the system comprising:
    a combustion chamber;
    an annular passage arranged around the combustion chamber;
    an igniter comprising a housing for enclosing an electrode, the igniter having a first end and an operative end that extends into the combustion chamber; and
    a first pressure sense passage integrated with the igniter, the first pressure sense passage having a first end and a second end, the second end of the first pressure sense passage at a location intermediate the first end and the operative end of the igniter; and
    a second pressure sense passage integrated with the igniter, the second pressure sense passage having a first end and a second end, wherein the second end is positioned at the operative end of the igniter.

10. The combustion system of claim 9, wherein the first pressure sense passage is attached to an outer surface of the housing.

11. The combustion system of claim 9, wherein the first pressure sense passage is parallel with the housing.

12. The combustion system of claim 9, wherein the first pressure sense passage and the housing are coaxial.

13. The combustion system of claim 9, wherein the combustion chamber is an augmenter.

14. The combustion system of claim 9, wherein the first pressure sense passage and the second pressure sense passage are attached to an outer surface of the housing.

15. The combustor system of claim 14, wherein the first pressure sense passage and the second pressure sense passage are coaxial with the housing.

16. The combustor system of claim 14, wherein the first pressure sense passage and the second pressure sense passage are parallel with the housing.

17. The combustor system of claim 9 and further comprising:
    a diffuser casing surrounding the combustion chamber and forming an annular passage therebetween, and wherein the first pressure sense passage is configured to direct fluid from the annular passage to a sensor.

18. The combustion system of claim 17, and further comprising:
    a flange radially extending from the first pressure sense passage; and
    a nut configured to fit over the flange and attach to a connection extending from the diffuser casing to maintain contact between the flange and the connection.

* * * * *

UNITED STATES PATENT AND TRADEMARK OFFICE
CERTIFICATE OF CORRECTION

| | | |
|---|---|---|
| PATENT NO. | : 8,733,078 B2 | Page 1 of 1 |
| APPLICATION NO. | : 12/943498 | |
| DATED | : May 27, 2014 | |
| INVENTOR(S) | : Hannes A. Alholm | |

It is certified that error appears in the above-identified patent and that said Letters Patent is hereby corrected as shown below:

In the Claims

Col. 7, Line 8
  Delete "surrounds"
  Insert --surrounding--

Col. 8, Line 3
  Delete "and" – after "chamber;"

Signed and Sealed this
Nineteenth Day of August, 2014

Michelle K. Lee
*Deputy Director of the United States Patent and Trademark Office*